United States Patent [19]

van den Boom et al.

[11] Patent Number: 4,469,316

[45] Date of Patent: Sep. 4, 1984

[54] ELASTOMERIC MOUNT WITH HYDRAULIC DAMPING

[75] Inventors: Johannes van den Boom, Kösching; Wilfried Leitner, Eichstätt; Gert Salewsky; Hans-Peter Gassen, both of Lenting, all of Fed. Rep. of Germany

[73] Assignee: Audi Nsu Auto Union AG, Neckarsulm, Fed. Rep. of Germany

[21] Appl. No.: 446,244

[22] Filed: Dec. 2, 1982

Related U.S. Application Data

[63] Continuation of Ser. No. 1,052, Jan. 4, 1979, abandoned.

[30] Foreign Application Priority Data

Jan. 24, 1978 [DE] Fed. Rep. of Germany ....... 2802896

[51] Int. Cl.³ ............................ F16M 7/00; F16F 5/00
[52] U.S. Cl. ................................. 267/140.1; 248/562; 267/113
[58] Field of Search ............... 267/113, 114, 122, 123, 267/134, 136, 140, 140.1, 140.4, 141.1; 188/298; 248/560, 562, 634

[56] References Cited

U.S. PATENT DOCUMENTS

| | | | |
|---|---|---|---|
| 2,387,065 | 10/1945 | Harding | 267/134 |
| 2,387,066 | 10/1945 | Harding | 267/134 |
| 2,696,980 | 12/1954 | Goodwin | 267/113 |
| 4,159,091 | 6/1979 | Le Salver et al. | 267/113 |
| 4,161,241 | 7/1979 | Larson | 188/298 |
| 4,199,128 | 4/1980 | van den Boom et al. | 248/562 |

Primary Examiner—Bruce H. Stoner, Jr.
Assistant Examiner—Robert J. Oberleitner
Attorney, Agent, or Firm—Karl F. Ross; Herbert Dubno

[57] ABSTRACT

A mount for securing together two relatively displaceable bodies, such as a motor-vehicle engine and a vehicle chassis, with limited relative freedom of movement has a substantially closed liquid-filled chamber formed by a first resiliently deformable wall and a second wall which may be rigid or resiliently deformable. A partition subdivides this chamber into a pair of compartments and has an elastically deformable and relatively stiff portion and an elastically deformable and relatively yieldable portion. One of these portions is formed with a throughgoing orifice. Stops are provided on each side of the relatively yieldable portion to limit the deflection thereof so that low-amplitude vibrations are not transmitted between the bodies, but high-amplitude vibrations are damped when the yieldable portion abuts the stops.

8 Claims, 2 Drawing Figures

ELASTOMERIC MOUNT WITH HYDRAULIC DAMPING

CROSS-REFERENCE TO RELATED APPLICATION

This application is a continuation of our now abandoned application Ser. No. 001,052 filed Jan. 4, 1979.

FIELD OF THE INVENTION

Our present invention relates to an elastomeric mount with hydraulic damping, serving to interconnect two relatively displaceable bodies. More particularly, this invention concerns such a mount preferably for mounting an internal-combustion engine in an automotive vehicle and having a damping-fluid-filled working chamber defined on one side by a load-bearing elastomeric first wall connected with a support block and bounded on the other side by a second wall, this chamber being subdivided into two compartments by a movable partition having at least one throttle hole.

BACKGROUND OF THE INVENTION

U.S. Pat. No. 2,387,065 describes a type of elastomeric mount. In this elastomeric mount a working chamber filled with fluid is subdivided by a partitioning membrane into two compartments and the partitioning membrane is connected by a rigid part, having a throttle orifice, with a support block and with a supporting elastomeric element. On compression of the mount downwardly, fluid which is pressurized in the lower compartment is bled through the throttle passage into the upper compartment. Good damping characteristics of the bearing are only obtained when the partition membrane is relatively stiff, so that during compresssion it does not yield to the increased pressure and force considerable damping liquid to flow through the throttle orifice.

When such a mount is used for supporting an internal-combustion engine in an automotive vehicle, good damping characteristics are only desired in the low-frequency oscillation range caused by road-surface unevennesses. For higher-frequency vibrations in the audible range the above-described mount retains its good damping and is, therefore, relatively hard, so that considerable sound from the engine is transmitted to the chassis and thence to the passenger compartment.

If the membrane is made relatively yieldable, damping for higher-frequency vibrations is reduced by deformation of the membrane as a result of the pressure differentials across it; then, however, in the lower-frequency road-caused vibration range the necessary damping is not obtained.

OBJECT OF THE INVENTION

It is an object of the invention to provide an elastomeric mount with good damping characteristics in the range of low-frequency vibrations of large amplitude and with little sound-transmission stiffness in the range of higher-frequency vibrations with small amplitudes.

SUMMARY OF THE INVENTION

This object is attained according to the instant invention in a mount of the above-described type wherein at least a portion of the movable partition has a limited inherent stiffness which increases greatly with increasing deformation.

With the hydraulically damped elastomeric mount according to the invention on compression there is formed in a known manner a pressure differential between two compartments connected together through a throttle orifice. The pressure differential is equalized by flow of the damping liquid. In this manner energy is used and the vibrational movement is damped. When such a mount is used for supporting an internally-combustion engine in an automotive vehicle, the volumes of the chambers only vary a little on high-frequency vibrations of normally small amplitude, for instance caused by the engine. The damping of such vibrations is therefore very reduced, as the yieldable portion of the movable partition yields to the pressure differential and for this reason no damping liquid flows between the chambers. With low-frequency road-caused vibration of large amplitude the bearing is greatly compressed. The yieldable portion of the movable partition yields somewhat to the pressure built up, but is deflected less with increased deformation as a result of its stiffness according to this invention. Thereafter volume equalization between the compartments can only take place by flowing of damping liquid between the compartments, that is the mount damps for low-frequency vibrations. Excellent damping characteristics are achieved in the low-frequency vibration range with good sound insulation in the audible range.

An advantageous feature of the invention is that the yieldable portion of the movable wall has a rigid central part that is surrounded by an elastic annular part, and the rigid central part is arranged between deflection limiters. On contact of the rigid central part with the deflection limiters this part of the movable partition can no longer be deformed, that is the relative yieldability increases greatly according to this feature of our invention beyond a predetermined deformation (spacing of the deflection limiters). The spacing of the deflection limiters lies in the range of the vibration amplitudes of the vibrations caused by the motor.

Advantageously the throttle orifices are arranged in a rigid central part, as here they maintain shape and size independently of the shape and deflection of the movable partition.

In an advantageous embodiment of the invention the movable partition is connected with a support block. On compression of the mount, the support block is immediately moved and is effective over its entire displacement directly on the movable partition. This embodiment has a movable partition formed in part as an accordion-type cuff and its working chamber is delimited by a cover flanking the support block with the elastomeric element, an elastic abutment ring being arranged on the movable partition directed toward a rigid cover constituting the second wall. Such an arrangement has shown itself effective because of its simple construction, its good damping characteristics, and its excellent adaptability to different mounting modes.

In the arrangement described above, the accordion-type cuff has the advantage that it resists compression and stretching of the mount with only modest resistance, yet does not yield readily to pressure differentials between the compartments. The damping characteristics of the mount are therefore largely independent of the position and the static loading of the mount.

A stop ring on the displaceable partition is effective as a damping stop for extreme deflection of the mount against a working-chamber limiting cover.

SPECIFIC DESCRIPTION

Figure 1:
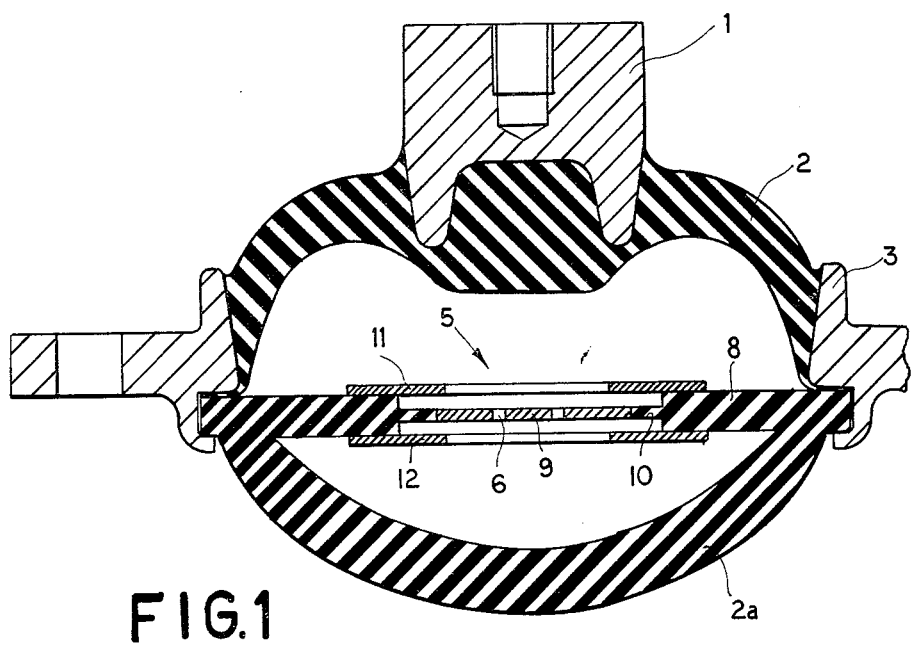
FIG. 1 shows a section through an elastomeric mount whose working chamber is defined on both sides by elastomeric elements.

The working chamber of the mount shown in FIG. 1 is formed between an upper elastomeric element 2 vulcanized to a support block 1 and a lower elastomeric part 2a, the elastomeric parts 2 and 2a as well as a movable partition 5 which subdivides the working chamber into two compartments 4 and 4a being connected to a flange 3. The movable partition 5 is formed of an imperforate outer ring 8, integral with wall 2a, a rigid central part 9 with throttle orifices 6, and an imperforate elastic annular intermediate part 10 connecting the ring 8 and the rigid central part 9. The rigid central part 9 is arranged between two deflection limiters or stop members 11 and 12 carried on opposite surfaces of ring 8 adjacent its inner periphery, thus at a radial distance of the junction of chamber walls 2, 2a.

On compression of the mount an easily yieldable or relatively soft portion of the partition between the two compartments, here comprise of the elastomeric annular part 10 and the rigid central part 9, yields according to the pressure difference between the two compartments 4 and 4a. Only when the rigid central part 9 abuts against one of the deflection limiters 11 or 12 does a strong damping commence as a result of a significant throughflow of the hydraulis damping liquid filling the chamber. As a result the mount only damps very little for vibrations of small amplitude, such as those created at high frequency by the internal-combustion engine, since as a result of the deflection of a membrane section only a little damping liquid will tranverse the partition. With low-frequency vibrations of large amplitude the pressure differential is effective for a longer time across the movable partition, so that the rigid central part 9 abuts against one of the deflection limiters 11 and 12 and as a result the effective pressure cannot be compensated and to equalize the pressure differential considerable damping liquid must flow between the compartments 4 and 4a. The damping is therefore large for vibrations of large amplitude, as are for example caused by road unevenness in the low-frequency range.

Figure 2:
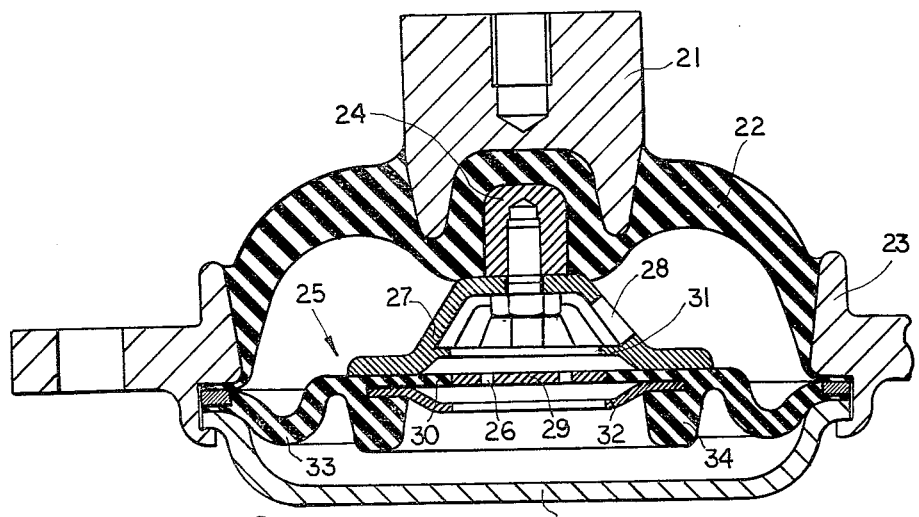
FIG. 2 shows a section through an elastomeric mount whose working chamber is defined by an elastomeric part and by a rigid part, and whose movable partition is connected with a support block.

In the elastomeric mount shown in FIG. 2 the working chamber is delimited by an elastomeric element 22 in which is vulcanized a support block 21, bounding its upper compartment, and by a rigid cover 35, bounding its lower compartment. A movable partition 25 is connected by a rigid member 27 with a block 24 fitted into the elastomeric element 22. The rigid member 27 has large flow orifices 28 and an annular portion forming a deflection limiter 31. A rigid central part 29 with throttle orifices 26 and an elastomeric annular part 30 of relative yieldability is arranged between the deflection limiter 31 and a second deflection limiter 32. An accordion-type cuff 33 forms the remainder of the movable partition and the connection to a flange 23. The cuff 33 surrounding stop members or limiters 31, 32, the elastic annular part 30, and an elastic abutment ring 34 are formed by one and the same elastomeric member.

On depression of the support block 21 the wall 25 exerts a pressure in the lower compartment through the force-transmitting connection with the block 2. This pressure can deflect the rigid central part 29 by deformation of the elastic annular part 30, with little flow of damping fluid, until it abuts against the stop limiter 31 or 32. The pressure differential can thereafter only be equalized by flowing of the damping liquid through the throttle orifices 26. With vibrations of small amplitude the rigid central part 29 and the outer elastomeric part 30 vibrate between the limiters 31 and 32 at the response frequency of the support block 21, with only minimal flow of damping liquid through the throttle orifices 26. The mount is therefore yieldable with little damping and transmits only minor vibrational energy from, for example, the internal-combustion engine 7 connected to the support block 21 and the chassis 13 connected to the flange 23. With vibrations of greater amplitude the volumes of the compartments change more. For this large volume change a shifting of the fluid volume between the deflection limiters 31 and 32 is insufficient. The rigid central part 29 bears upon that limiter which lies in the chamber with the lesser pressure, and considerable damping liquid must flow through the throttle holes 26 to equalize the pressure difference between the compartments and to change the compartment volumes.

The mount therefore has good damping characteristics for vibrations of large amplitude such as, for example, those caused in the low-frequency range by road unevenness.

We claim:

1. A mount for securing two relatively displaceable bodies to each other with limited relative freedom of movement, comprising:
   a resiliently deformable first wall adapted to be secured to one of the bodies;
   a second wall forming with said first wall a substantially closed chamber filled with a hydraulic liquid, said second wall being securable to the other of said bodies;
   a substantially continuous partition subdividing said chamber into a pair of compartments respectively bounded by said first and second walls, said partition including
   (a) an elastically deformable and relatively stiff imperforate annular outer portion extending radially inward from a junction of said walls,
   (b) an elastically deformable and relatively yieldable imperforate annular intermediate portion of lesser thickness than said outer portion extending radially inward from said outer portion,
   (c) a rigid central portion of substantially the same thickness as said intermediate portion disposed within and supported by said intermediate portion, said central portion having at least one throughgoing orifice; and
   a pair of apertured annular stop members spacedly bracketing said central and intermediate portions, said stop members being supported on opposite surfaces of said outer portion adjacent an inner periphery thereof and at a radial distance from said walls for limiting the amplitudes of excursions of said central portion relative to said outer portion, the spacing of said stop members from each other being at least equal to the thickness of said outer portion.

2. The mount defined in claim 1 wherein said portions are unitary and said yieldable portion is a relatively thin web, said stiff portion being relatively thick.

3. The mount defined in claim 1 wherein both said walls are resiliently deformable.

4. The mount defined in claim 1 wherein said second wall is rigid.

5. The mount defined in claim 1 wherein said stop members are annular.

6. The mount defined in claim 1 wherein said stiff portion is formed as a nonplanar accordion-type cuff surrounding said stop members.

7. The mount defined in claim 1 wherein said second wall is resiliently deformable and is integral with said outer portion.

8. The mount defined in claim 1 wherein one of said stop members, located in the compartment bounded by said first wall, is attached to said first wall.

* * * * *